United States Patent
Deavours et al.

(10) Patent No.: US 8,564,439 B2
(45) Date of Patent: *Oct. 22, 2013

(54) MICROSTRIP ANTENNA FOR RFID DEVICE

(75) Inventors: Daniel D. Deavours, Lawrence, KS (US); Mutharasu Sivakumar, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/788,550

(22) Filed: May 27, 2010

(65) Prior Publication Data
US 2011/0291836 A1    Dec. 1, 2011

(51) Int. Cl.
*G08B 13/14* (2006.01)

(52) U.S. Cl.
USPC ............ 340/572.1; 340/572.4; 340/572.7; 340/572.8; 340/5.6; 340/10.51; 343/742; 343/746; 343/764; 343/767; 343/822

(58) Field of Classification Search
USPC .......... 340/572.1–572.8, 5.6, 10.51; 343/742, 343/746, 764, 767, 822, 860, 865
See application file for complete search history.

(56) References Cited

U.S. PATENT DOCUMENTS

| | | | |
|---|---|---|---|
| 5,300,936 A | 4/1994 | Izadian | |
| 5,406,298 A | 4/1995 | Walters | |
| 6,215,402 B1 | 4/2001 | Kodukula | |
| 6,320,509 B1 | 11/2001 | Brady | |
| 6,329,915 B1 | 12/2001 | Brady | |
| 6,441,740 B1 | 8/2002 | Brady | |
| 6,806,831 B2 | 10/2004 | Johansson | |
| 6,839,028 B2 | 1/2005 | Lee | |
| 6,929,412 B1 | 8/2005 | Barrus | |
| 6,963,317 B2 | 11/2005 | Zuk | |
| 6,975,834 B1 | 12/2005 | Forster | |
| 7,260,424 B2 | 8/2007 | Schmidt | |
| 7,298,273 B2 | 11/2007 | Baba | |
| 7,394,382 B2 | 7/2008 | Nitzan | |
| 7,400,298 B2 | 7/2008 | Fogg | |
| 7,443,347 B2 | 10/2008 | Mei | |

(Continued)

OTHER PUBLICATIONS

Constatine A. Balanis, "Linear Wire Antennas", Antenna Theory: Analysis Design, Third Edition, 2005, pp. 151-214; John Wiley & Sons, Inc.

(Continued)

*Primary Examiner* — Tai T Nguyen
(74) *Attorney, Agent, or Firm* — Spencer Fane Britt & Browne LLP

(57) ABSTRACT

Microstrip patch antenna (46), feed structure (48), and matching circuit (50) designs for an RFID tag (10). A balanced feed design using balanced feeds coupled by a shorting stub (56) to create a virtual short between the two feeds so as to eliminate the need for physically connecting the substrate to the ground plane. A dual feed structure design using a four-terminal IC can be connected to two antennas (46a,46b) resonating at different frequencies so as to provide directional and polarization diversity. A combined near-field/far-field design using a microstrip antenna providing electromagnetic coupling for far-field operation, and a looping matching circuit providing inductive coupling for near-field operation. A dual-antenna design using first and second microstrip antennas providing directional diversity when affixed to a cylindrical or conical object, and a protective superstrate (66). An annular antenna (46c) design for application to the top of a metal cylinder around a stem.

42 Claims, 9 Drawing Sheets

(56) References Cited

U.S. PATENT DOCUMENTS

| | | |
|---|---|---|
| 2001/0048361 A1 | 12/2001 | Mays |
| 2003/0058180 A1 | 3/2003 | Forester |
| 2004/0066338 A1 | 4/2004 | Chen |
| 2005/0024287 A1 | 2/2005 | Jo |
| 2005/0088344 A1 | 4/2005 | Saitou |
| 2005/0088354 A1 | 4/2005 | Chang |
| 2005/0243005 A1 | 11/2005 | Raf |
| 2006/0208900 A1 | 9/2006 | Tavassoli Hozouri |
| 2007/0200711 A1 | 8/2007 | Kai |
| 2009/0315676 A1* | 12/2009 | Hedges et al. ............... 340/10.1 |
| 2011/0032154 A1* | 2/2011 | Chung et al. ........... 343/700 MS |

OTHER PUBLICATIONS

"ECCOPAD Application Note", Emerson & Cuming Microwave Products, Feb. 15, 2006.
Daniel D. Deavours, A Performance Analysis of Commercially Available UHF RFID Tags Based on EPCglobal's Class 0 and Class 1 Specifications,: Report 1, RFID Alliance Lab, Lawrence, KS, Dec. 2004.
Daniel D. Deavours, "UHF EPC Tag Performance Evaluation," Report 2, RFID Alliance Lab, Lawrence, KS, May 2005.
"ECCOPAD Isolators for Read on Metal RFID" Emerson & Cuming Microwave Products, brochure Aug. 2006.
C.A.Diugwu, J.C. Batchelor, R.J. Langley, and M. Fogg, "Planar Antenna for Passive Radio Frequency Identification (RFID) Tags", 7th AFRICON Conference in Africa (AFRICON 2004) (Gaborne, Botswana), vol. 1, pp. 21-24. Sep. 2004.
Leena Ukkonen, Lauri Sydanheimo, Markku Kivikoski, "A Novel Tag Design Using Inverted-F Antenna for Radio Frequency Identification of Metallic Objects," Proc. IEEE Sarnoff Symposium on Advances in Wired and Wireless Communication (Princeton, NJ), pp. 91-94, 2004.
Leena Ukkonen, Lauri Sydanheimo, Markku Kivikoski, "Effect of Metallic Plate Size on the Performance of Microstrip Patch-Type Tag Antennas for Passive RFID," IEEE Antenna and Wireless Propagation Letters, vol. 4, pp. 410-413, 2005.
Leena Ukkonen, Marijke Schaffrath, Daniel W. Engels, Lauri Sydanheimo, and Markku Kivikoski, Operability of Folded Microstrip Patch-Type Tag Antenna in the UHF RFID Bands within 865-928 MHz; Apr. 2006.
ECCOPAD UHF 915 MHz Isolator RFID Tags on Metal, Emerson & Cuming Microwave Products, Randolph,, MA, revision Aug. 4, 2005.
ECCOPAD Metaltag, Read on Metal UHF RFID Tag, Emerson & Cuming Microwave Products, Randolph,, MA, revision Aug. 17, 2007.

* cited by examiner

MICROSTRIP ANTENNA FOR RFID DEVICE

RELATED APPLICATIONS

The present non-provisional patent application is a continuation patent application of application Ser. No. 11/610,048, filed Dec. 13, 2006, titled MICROSTRIP ANTENNA FOR RFID DEVICE, now U.S. Pat. No. 7,750,813, which application claims priority benefit of earlier-filed provisional patent application titled RADIO FREQUENCY IDENTIFICATION (RFID) ANTENNA TECHNIQUES, Ser. No. 60/750,182, filed Dec. 14, 2005. Both identified earlier-filed applications are hereby incorporated by reference into the present continuation application.

FIELD OF THE INVENTION

The present invention relates generally to radio frequency identification (RFID) devices, and, more specifically, to microstrip patch antennas for RFID devices and methods for making same.

BACKGROUND OF THE INVENTION

RFID devices are used in a variety of different applications, including, for example, monitoring, cataloging, and tracking items. An RFID system typically includes a transponder, or "tag", for storing and transmitting data, an interrogator, or "reader", for receiving the data from the tag, and a data communications network for conveying the data received by the interrogator to an information system.

RFID tags generally have a tag antenna and an integrated circuit (IC). Tag antennas can be constructed from a variety of materials, including silver, copper, and aluminum, and can be printed (e.g., silkscreen, gravure, flexography), etched, stamped, or grown. Tags are "active" if they contain an internal power source, and "passive" if they receive power from an external source such as the interrogator. Battery assisted tags (BATs) are a type of passive tag that uses an internal source to power the IC and an external source to power RF transmission.

Typically, in a two-terminal IC, one terminal is connected to a first pole of a dipole antenna, and the other terminal is connected to a second pole of the dipole antenna. In a four-terminal IC, one pair of terminals may be connected to a first dipole antenna, and the other pair of terminals may be connected to a second dipole antenna. Typically, the two dipole antennas are planar and orthogonal in space, which provides polarization and directional diversity.

RFID interrogators have an interrogator antenna and use radio frequency signals to acquire data remotely from tags that are within range. More specifically, the tag communicates with the interrogator by modulating the scattering parameters of the tag antenna. For example, the IC presents an impedance that is the complex conjugate of the antenna impedance; as a result, half of the RF energy will be delivered to the IC, and half scattered or re-radiated into space. However, a dipole antenna in which the two feed points are shorted is effectively a metal wire of resonant length. RF energy of the resonant frequency induces currents in the resonant wire. Since a wire is an excellent conductor, little energy is turned into heat and nearly all of the RF energy is scattered. By modulating its impedance, the IC of the passive tag is able to change the amount of energy scattered by the tag. The interrogator detects this change in the magnitude or phase of the backscattered energy and thereby detects signals from the tag.

RFID systems operate over a range of different frequencies, including low frequency (LF), typically around 125-135 KHz, high-frequency (HF), typically around 13.56 MHz, ultra-high-frequency (UHF), typically around 315 MHz, 433 MHz, or 900 MHz, and microwave radio bands, typically around 2.4 to 5.8 GHz. At LF and HF frequencies, the tag antenna is typically coupled to the interrogator antenna by a magnetic component of the reactive near-field, in which both antennas are typically configured as coils in a resonant circuit. However, typical antennas used in near-field systems are typically only a small fraction of a wavelength in their linear dimensions and, therefore, are inefficient electromagnetic radiators and receptors. As a result, the useful range of operation may be limited to as little as a few inches from the interrogator antenna. Such a short read distance is a significant disadvantage in many applications.

At UHF and microwave frequencies, the tag antenna is typically coupled to the interrogator antenna by a radiating far-field, which uses electromagnetic (EM) waves that propagates over distances typically of more than a few wavelengths. As a result, the useful range of operation can be up to twenty feet or more. However, compared to the HF band, the radiation and reception of EM waves at these higher frequency bands are affected much more strongly by obstacles and materials in the immediate environment of the antennas. In particular, attaching tags to metal objects or containers containing metal or water is problematic.

Many UHF RFID tags are provided with resonant dipole antennas. Dipole antennas are known to have good free-space characteristics, have a convenient form factor, and are easy to design and manufacture. However, dipole antennas suffer considerable performance degradation when placed near a high-loss and/or high-dielectric material, such as water, or near a conductor, such as metal. This is commonly referred to as the "metal/water problem" and occurs because the dielectric material changes the electromagnetic properties of the antenna, which changes the resonant frequency and efficiency of the antenna. More specifically, when a dipole antenna is placed near a conductor, the operation of the antenna changes from that of a "free space resonator" to a "volume resonator", which impacts the performance of the antenna in a number of ways. If the antenna is no longer resonant, it becomes less efficient at radiating and receiving RF energy. The bandwidth of the antenna becomes narrower, such that the antenna is only efficient over a much smaller range of frequencies. If the antenna is intended to operate outside of this narrow band, it will suffer degraded performance. Furthermore, as the resonant frequency of the antenna changes, the characteristic impedance of the antenna changes. This further degrades performance by reducing efficient power transfer between the antenna and the IC. Additionally, if the dielectric material is lossy (e.g., water), the dielectric loss further contributes to the degradation of antenna performance. Additionally, if the antenna is very close to metal, the conductive losses of the antenna can become more pronounced, especially when not operating at its resonant frequency. Various solutions to these problems have been proposed, but all suffer from one or more limitations and disadvantages.

Some RFID tags are provided with microstrip antennas. A microstrip antenna is an antenna comprising a thin metallic conductor bonded to one side of a substrate, and a ground plane is bonded to the opposite side of the substrate. Microstrip antennas behave primarily as volume resonators, which is fundamentally different from dipole antennas commonly provided with UHF RFID tags. Generally, a tag incorporating a microstrip antenna also comprises a feed structure and matching circuit. The antenna, feed structure, and matching circuit are designed specifically to operate with the substrate, and the ground plane electrically isolates the antenna from the material to which it is attached.

Typical microstrip feed structures include a coaxial feed, microstrip (coplanar) feed, proximity-coupled microstrip feed, aperture-coupled microstrip feed, or coplanar waveguide feed. In each case, the antenna couples to a single unbalanced transmission line.

There are two common exceptions to the single unbalanced transmission line feed structure. The first involves a coplanar waveguide (CPW), commonly used with a balanced feed to excite the waveguide. A CPW is typically constructed by scribing slot lines in the ground plane and requires precise alignment, which significantly increases manufacturing costs. Furthermore, the scribed ground plane is unsuitable for many RFID applications in which the tag is intended to be mounted directly on metal.

The second exception is the use of two feeds to a square or round microstrip antenna, where one feed is fed 90 degrees out of phase with respect to the other feed. This may be done with edge-fed microstrip transmission lines (feeding two different edges) or two coaxial probes (feeding along different axes) in order to achieve circular polarization of the antenna. This two-feed structure is normally derived from a single feed that is divided, with one post-division transmission line being one-quarter wavelength longer than the other, which achieves the 90 degree phase difference.

Existing microstrip antenna-based RFID tags are significantly complex to manufacture. This is due, at least in part, to the incorporation of a physical connection, e.g., a via, between the IC and the ground plane to provide an electrical reference for the IC. The resulting non-planar connecting structure significantly increases manufacturing complexity.

SUMMARY OF THE INVENTION

The present invention overcomes the above-described and other problems by providing an improved microstrip patch antenna, feed structure, and matching circuit for an RFID tag, including a balanced feed design, a dual feed structure design, a combined near-field/far-field design, a dual antenna design, and an annular design. In doing so, the present invention enables the use of commodity, low-cost products, such as inlays, and commodity, low cost assembly methods, such as label applicators and web conversion.

The balanced feed design uses balanced feeds coupled by a virtual shorting stub to create a virtual short halfway between the two feeds so as to eliminate the need for physically connecting the substrate to the ground plane. In one embodiment of this design, the tag comprises the microstrip antenna, first and second feeds coupled with a non-radiating edge of the microstrip antenna and 180 degrees out of phase with each other, and a matching circuit coupling the first and second feeds to an IC, wherein the matching circuit includes a shorting stub coupling the first and second feeds together.

The dual feed structure design uses a four-terminal IC connected to two patch antennas by matching circuits resonating at different frequencies so as to provide directional and polarization diversity. In one embodiment of this design, the tag comprises first and second patch antennas, an IC having first and second pairs of terminals, a first matching circuit for coupling the first patch antenna to the first pair of terminals on the IC, wherein the first matching circuit resonates at a first frequency, and a second matching circuit for coupling the second patch antenna to the second pair of terminals on the IC, wherein the second matching circuit resonates at a second frequency. In one embodiment, the first antenna is a micro strip antenna operable above a ground plane separated by a substrate, and the second patch antenna is a dipole antenna operable with the substrate in free space. In one embodiment, the first frequency is identical to the second frequency.

The combined near-field/far-field design uses a microstrip antenna providing electromagnetic coupling for far-field operation, and a looping matching circuit providing inductive coupling for near-field operation. In one embodiment of this design, the tag comprises a microstrip antenna providing electromagnetic coupling for far-field operation, an IC, and a matching circuit coupling the microstrip antenna with the integrated circuit, wherein the matching circuit has the shape of a loop that is sufficiently large to provide inductive coupling for near-field operation.

The dual antenna design uses first and second microstrip antennas providing directional diversity when affixed to a cylindrical or conical object, and a protective superstrate. In one embodiment of this design, the tag comprises a first layer including a substrate and a ground plane, a second layer including first and second microstrip antennas, with each antenna extending toward a different side of the second layer, an IC, and first and second matching circuits coupling the first and second microstrip antennas, respectively, to the IC, and a third layer including a superstrate for protecting the second layer from an adverse condition of an operating environment, such as physical impacts or high temperatures. The superstrate of the third layer may have a higher dielectric than the substrate of the first layer.

The annular design is particularly suited for application to the top of a metal cylinder around a stem. In one embodiment of the design, the tag comprises a microstrip antenna having an annular shape with an inner edge and an outer edge, an IC, and a matching circuit coupling the micro strip antenna with the IC. In alternate embodiments, the matching circuit is coupled with the inner or the outer edge of the annulus. In one embodiment, the annular shape may be circular or polygonal.

It will be appreciated that features of any two or more of the designs may be combined for maximum advantage.

These and other features of the present invention are described in more detail in the section titled DETAILED DESCRIPTION, below.

BRIEF DESCRIPTION OF THE DRAWINGS

The following drawings form part of the present specification and are included to further demonstrate certain aspects of the present invention. The figures are examples only, and do not limit the scope of the invention.

DETAILED DESCRIPTION

With reference to the figures, an RFID tag is herein described, shown, and otherwise disclosed in accordance with one or more preferred embodiments of the present invention. More specifically, the present invention concerns improved microstrip patch antenna, feed structure, and matching circuit designs for an RFID tag, including a balanced feed design, a dual feed structure design, a combined near-field/far-field design, a dual antenna design, and an annular design.

Figure 1:
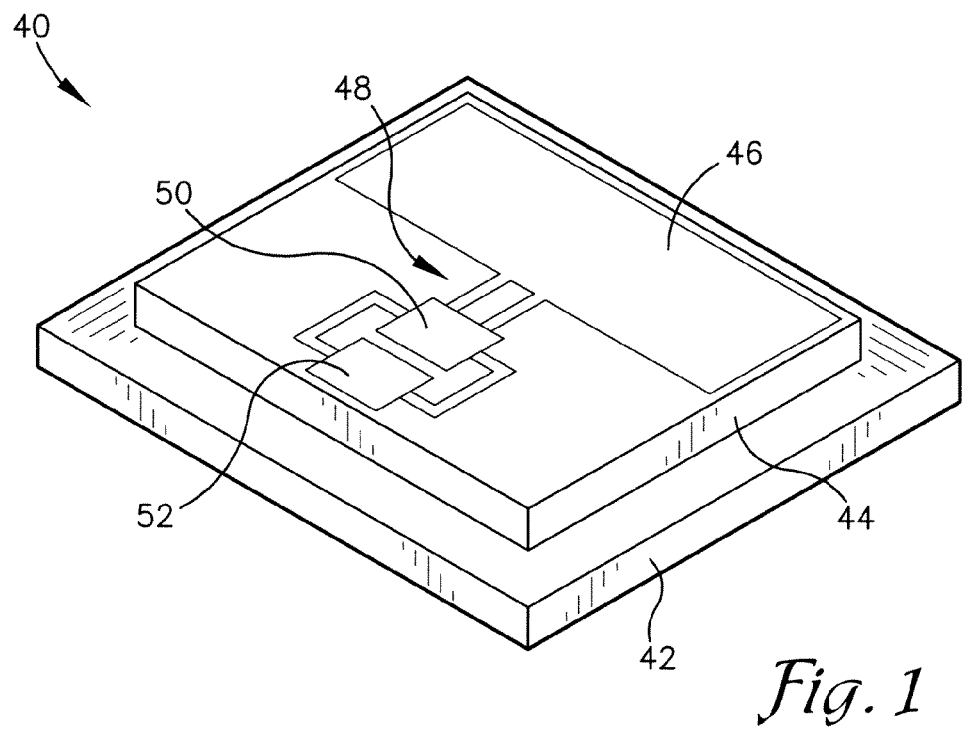
FIG. 1 is an isometric view of a model RFID tag to which the improvements of the present invention can be applied.

Referring to FIG. 1, a model RFID tag 40, or "transponder", is shown comprising a ground plane 42, a dielectric substrate 44, a microstrip antenna 46, a feed structure 48, a matching circuit 50, and an IC 52. The antenna 46, feed structure 48, and matching circuit 50 are designed to operate with the ground plane 42 and the dielectric substrate 44 to electrically isolate the antenna 46 from the material to which the tag 40 is attached. Generally, the microstrip antenna 46 of the present invention is a patch-type antenna, not a dipole-type antenna.

Figure 2:
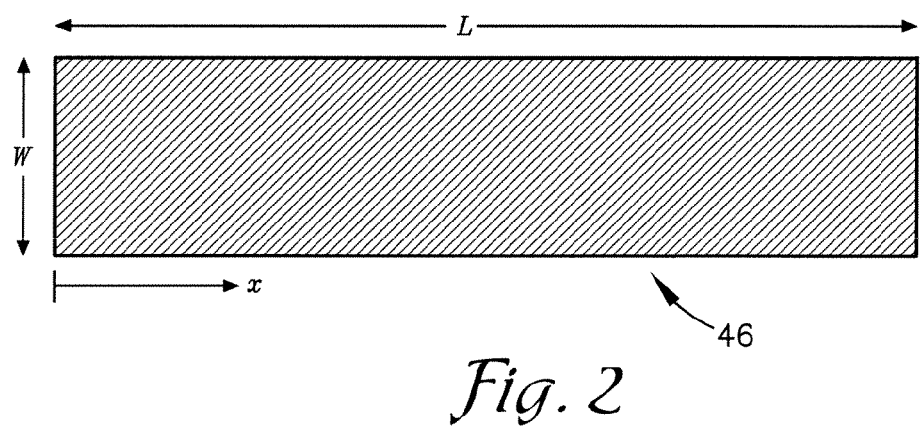
FIG. 2 is a plan view of a model microstrip antenna such as may be used in implementing the improvements of the present invention.

Referring to FIG. 2, a model antenna 46 is shown to demonstrate the coordinate system used in the following discussion. The model 46 is of a rectangular microstrip antenna with length L and width W, though other geometries may be used. The model antenna 46 may include a substrate with a thickness, h, a dielectric constant, $\in_r$, and loss tangent, tan δ. The physical distance along the long axis is x, with x=0 describing the left edge of the rectangular patch, and x=L describing the right edge. V(x) and I(x) are the voltage and current, respectively, at point x. For simplicity, the current and voltage in the y direction are assumed to be uniform.

It is observed that I(0)=I(L)=0. It is also observed that the first non-trivial solution that satisfies the boundary conditions is:

$$I(x) = I_0 \sin\left(\frac{2\pi x}{\lambda_e}\right) e^{j\phi},\quad\text{Eq. 1}$$

where $\lambda_e$ is the effective wavelength taking into account the dielectric constant of the substrate and any fringing field effects. Similarly, the voltage distribution along the x-axis may be derived as follows:

$$V(x) = V_0 \cos\left(\frac{2\pi x}{\lambda_e}\right) e^{j\phi}\quad\text{Eq. 2}$$

If L>W, then the above solution describes the first resonant mode, or the $TM_{0,1}$ mode. First, it is noted that the current has even mode symmetry around the center of the antenna, i.e., I(L/2−x)=I(L/2+x). Second, it is noted that the voltage has odd mode symmetry around the center of the antenna, i.e., V(l/2−x)=−V(L/2+x). Third, at the middle of the antenna, I(L/2)=$I_0$ and V(L/2)=0, and, thus, the impedance Z(L/2)=0. The first two observations are used for designing balanced feeds, and the third is used for designing unbalanced feeds and for subsequent analysis.

The model RFID tag 40 and the model antenna 46 are provided to facilitate the following discussion, and do not limit the scope of the present invention.

Microstrip Antenna with Balanced Feed

As discussed, at least part of the complexity in manufacturing microstrip antennas results from the need to ground the IC 52, which generally involves creating a physical connection between the IC 52 and the ground plane 42. This problem is avoided by a balanced feed design using balanced feeds coupled by a shorting stub to create a virtual short halfway between the two feeds so as to eliminate the need for physically connecting the substrate to the ground plane. In one embodiment of this design, the tag comprises the microstrip antenna, first and second feeds coupled with a non-radiating edge of the microstrip antenna and 180 degrees out of phase with each other, and a matching circuit coupling the first and second feeds to an IC, wherein the matching circuit includes a shorting stub coupling the first and second feeds together. The resulting tag can be entirely planar, i.e., with no structures connecting one plane to another, which significantly simplifies manufacture. In one embodiment, the first and second feeds consist of microstrip transmission lines.

Figure 3:
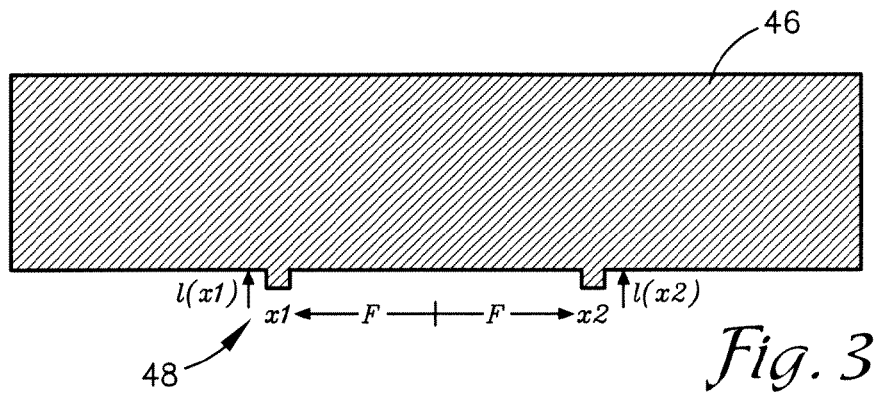
FIG. 3 is a plan view of the microstrip antenna having first and second feed structures.

More specifically, referring to FIG. 3, one way to attach a feed to a rectangular microstrip antenna is to place the feed on a non-radiating edge at some distance F from the middle of the patch, e.g., at $x_1$=L/2−F. The feed may be coupled to the non-radiating edge at a point chosen so that Z(L/2−F)=$Z_{0,t}$, where $Z_{0,t}$ is the characteristic impedance of the feeding transmission line. Note that because of the symmetry, the point $x_2$=L/2+F would work equally well. Other points along the non-radiating edge may also be suitable under different constraints and objectives.

By observing the symmetries in the RFID tag, the relationship between the two feed points $x_1$ and $x_2$ can be analyzed. While they both have approximately the same impedance, the time-varying behavior of the voltages are opposite, or equivalently, 180 degrees out of phase. Thus, the currents flowing through the feeds are opposite in direction, or equivalently, 180 degrees out of phase. Therefore, the two feeds may be considered to be 180 degrees out of phase.

Figure 4:
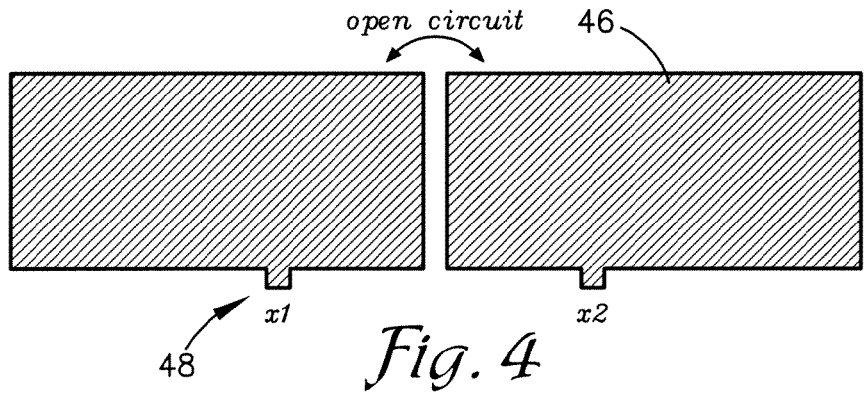
FIG. 4 is a plan view of the microstrip antenna having first and second balanced feed structures driven in an even mode.
Figure 5:
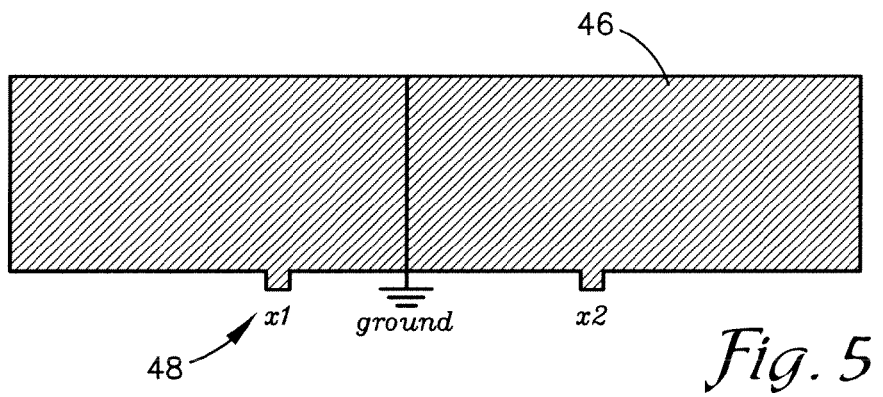
FIG. 5 is a plan view of the microstrip antenna having first and second balanced feed structures driven in an odd mode.

Another formulation for the current and voltage behavior is to use even and odd mode analysis. Referring to FIG. 4, feed points $x_1$ and $x_2$ in the even mode (in phase) results in an open circuit in the middle of the rectangular patch. If the antenna is driven in the even mode, there is no excitation of the $TM_{0,1}$ resonant mode. Referring to FIG. 5, if the feed points $x_1$ and $x_2$ are driven in the odd mode, then a virtual short circuit develops in the middle of the rectangular patch, and the $TM_{0,1}$ resonant mode is excited. Therefore, the odd mode analysis is sufficient to describe the rectangular patch behavior at frequencies near the $TM_{0,1}$ resonance. This is also true for rectangular patches in which a nearly square patch would have a $TM_{1,0}$ mode that could also be excited, and the odd mode symmetry is not sufficient to describe its behavior, and, thus, is subject to a different analysis.

The port impedance of point $x_1$ may be defined as:

$$Z(x_1)=V(x_1)/I(x_1), \quad \text{Eq. 3}$$

where $V(x_1)$ is the voltage at location $x_1$ with respect to ground. From the analysis, a new port $P^{12}$, which is the port defined across points $x_1$ and $x_2$ can be defined. The impedance of port $P^{12}$ is defined as follows:

$$Z^{12} = \left(\frac{V(x_1) - V(x_2)}{I(x_1)}\right) \quad \text{Eq. 4}$$

Because of the odd mode symmetry, it can be shown that:

$$Z^{12}=2Z(x_1)=2Z(x_2) \quad \text{Eq. 5}$$

Figure 6:
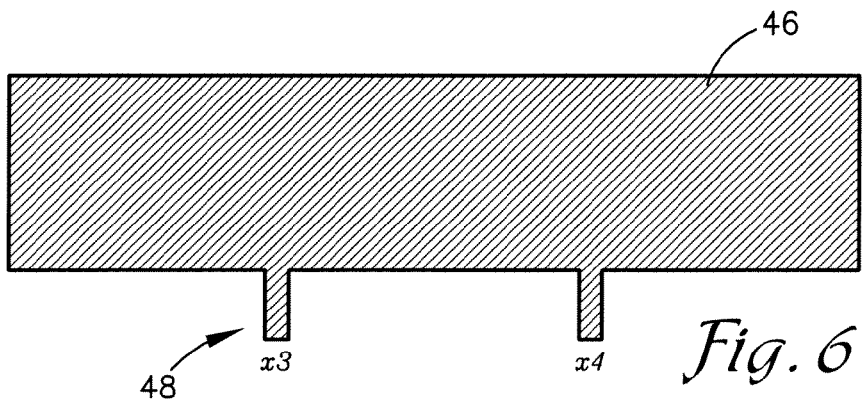
FIG. 6 is a plan view of the microstrip antenna having first and second balanced feed structures which have been extended with transmission lines.

Referring to FIG. 6, if the transmission lines with length l are extended from the feeds in a symmetric way, the odd mode symmetry can be preserved. The input impedance at points $x_3$ and $x_4$ are transformed using the standard transmission line equations. If $Z_0$ is the characteristic impedance of the transmission lines, and l is the length of the transmission line, then:

$$Z(x_3) = Z_0\left(\frac{Z(x_1) + jZ_0\tan\beta l}{Z_0 + jZ(x_1)\tan\beta l}\right) \quad \text{Eq. 6}$$

The expression for $Z(x_4)$ is similar. The odd mode symmetry is preserved, and, thus, odd mode analysis can be used to describe the antenna. If the transmission lines are further extended in a symmetric way, the odd mode symmetry can be preserved and the odd mode analysis can be sufficient to describe the circuit. Furthermore, the relationship $Z^{34}=2Z(x_3)=2Z(x_4)$ continues to hold.

Figure 7:
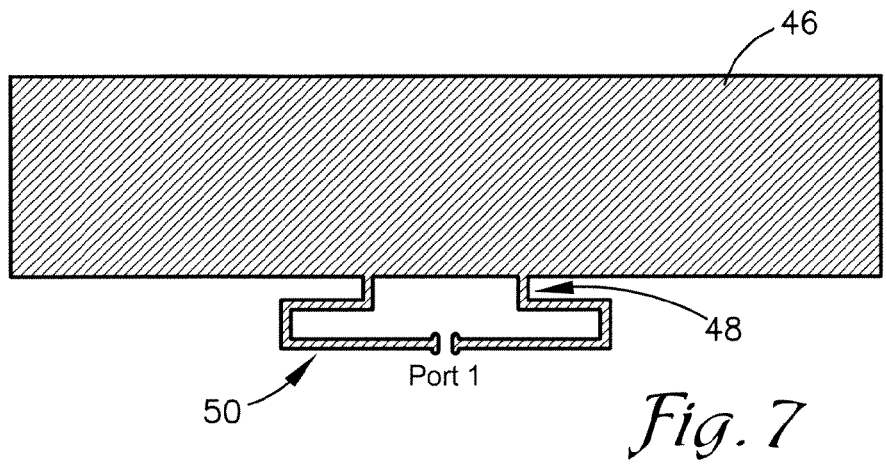
FIG. 7 is a plan view of the microstrip antenna having first and second balanced feed structures coupled with a matching circuit comprising first and second transmissions lines.

From the above-discussed odd symmetry analysis, a matching circuit can be constructed entirely out of transmission lines. Referring to FIG. 7, in the simplest circuit, the transmission lines alone transform the impedance. In this example, the antenna and matching circuit was designed for an IC having an impedance of approximately 34+j110Ω, the dielectric having a thickness of approximately 0.062 inches, with $\in_r$=2.41 and tan δ=0.0035.

Figure 8:
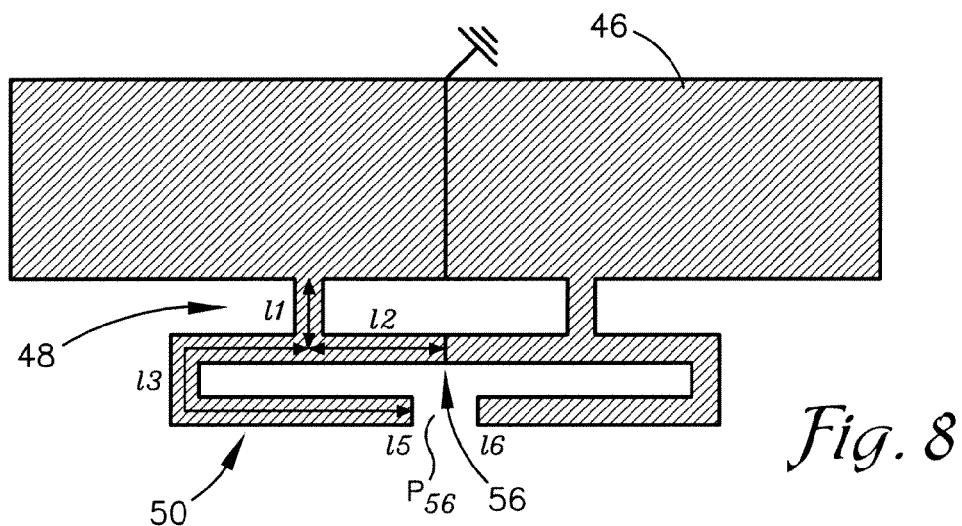
FIG. 8 is a plan view of the microstrip antenna having first and second balanced feed structures coupled by a shorting stub.

Referring to FIG. 8, a single shorting-stub matching circuit can also be constructed using transmission lines. In one embodiment, the feed points are extended by length l1. Transmission lines of length l2 form a shorting stub 56 coupling the feed points, and can be subsequently transformed by another transmission line of length l3. The transmission line of length l2 ends at a virtual short circuit, which can be shown using the same odd mode analysis used above. By choosing the feed point impedance and the lengths and widths of the transmission lines, substantially any impedance to port $P^{56}$ may be feasible.

Figure 9:
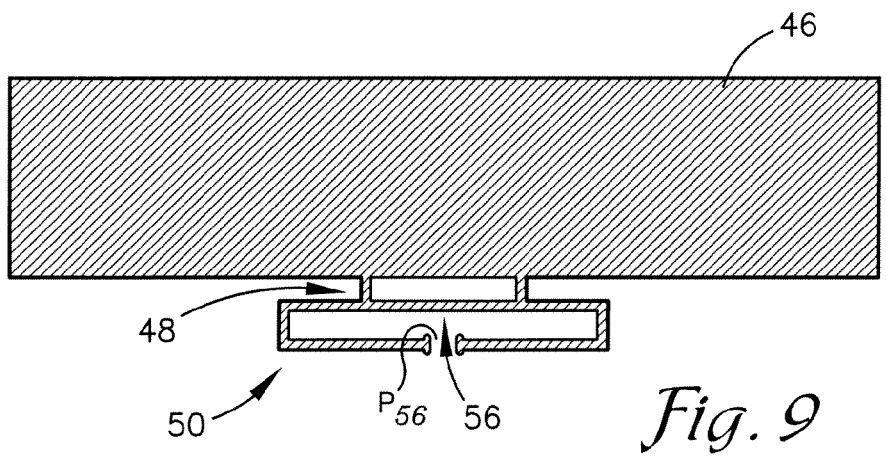
FIG. 9 is a plan view of the microstrip antenna having first and second balanced feed structures coupled by a shorting stub.

The IC can be coupled to the matching circuit across this port. Referring to FIG. 9, in one embodiment, the complex conjugate of the IC impedance is presented across port $P^{56}$.

Other matching circuit configurations are also contemplated. For example, tapered lines matching circuits, open stubs matching circuits, multiple shorting or open stubs matching circuits, or multi-sectioned, series-connected transmission lines matching circuits, or other matching circuit geometries may be coupled to the antenna.

Figure 10:
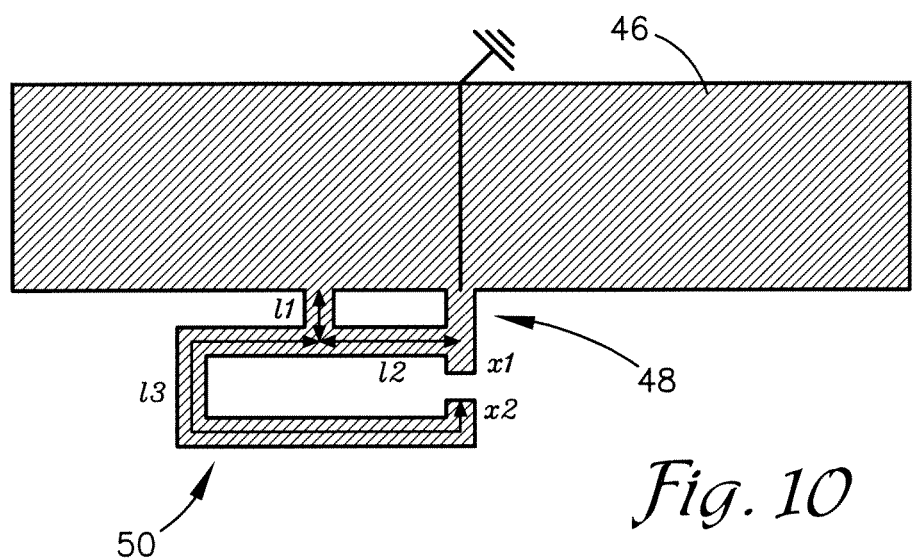
FIG. 10 is a plan view of a microstrip antenna having first and second feeds coupled asymmetrically to the antenna.

As mentioned, the middle of a rectangular patch antenna has a voltage of zero (V(L/2)=0). A good conductor with a voltage of zero is effectively a short circuit. Thus, the middle of the rectangular patch antenna may be used as a virtual reference to ground. This feed may be used two ways: first, to provide an electrical reference for one end of an IC, and, second, as a reference for a shorting stub for the construction of a matching circuit, such as the shorting-stub matching circuit on a rectangular patch antenna shown in FIG. 10. It is noted that other matching circuits would be suitable, including, without limitation, transmission lines, stepped transmission lines, a multiplicity of stepped transmission lines, tapered transmission lines, a combination of stepped and tapered transmission lines, shorting stubs with a single stub or a multiplicity of stubs.

Figure 11:
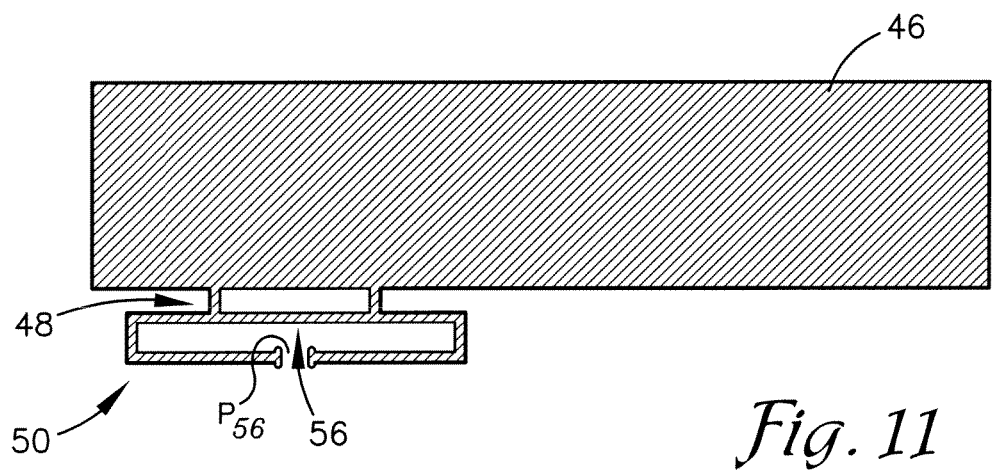
FIG. 11 is a plan view of the antenna having first and second asymmetric balanced feeds coupled by a shorting-stub.

In another embodiment, the two feeds to an antenna are aligned so that they are neither balanced nor unbalanced, but rather are asymmetrically placed along the non-radiating edge of the antenna. An embodiment of a balanced feed shorting-stub matching circuit is shown in FIG. 11. While this feed structure is feasible for some antenna designs, the asymmetric feed may not be as efficient as the symmetric feeds.

Figure 11A:
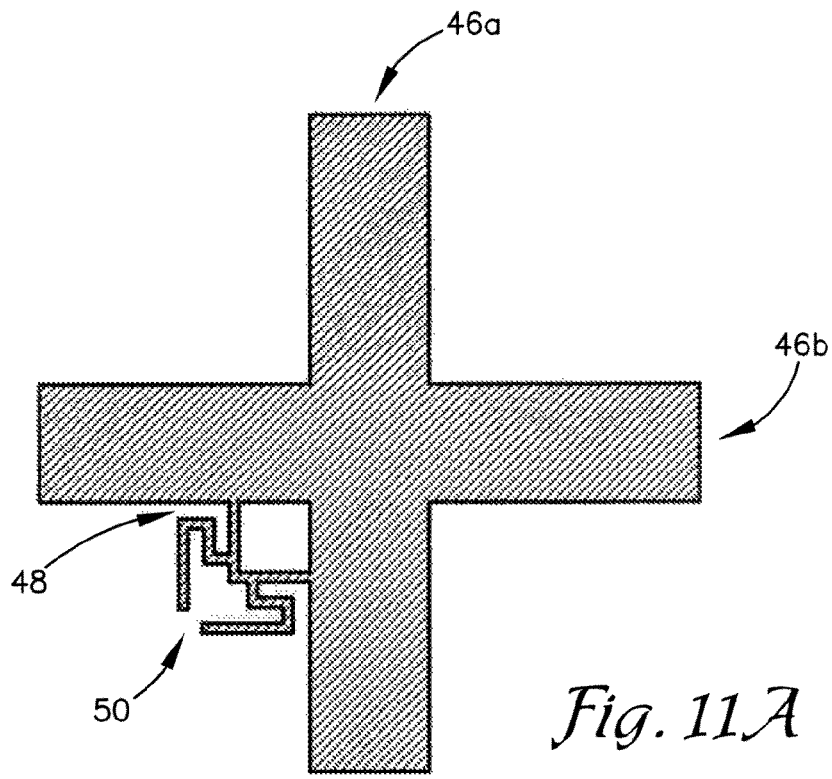
FIG. 11A is a plan view of a two-element microstrip antenna which resonates at two different frequencies.

Referring to FIG. 11A, two antennas 46a,46b are shown that resonate at different frequencies with a single balanced feed 48 and appropriate matching circuit 50. More specifically, two rectangular microstrip antennas 46a,46b are configured such that they intersect to form a cross, providing both dual-resonance and dual-polarization. In one embodiment, the first antenna 46a is tuned to resonate at approximately 867 MHz and has first polarization, while the second antenna 46b is tuned to resonate at approximately 915 MHz and has second polarization. At 867 MHz, the first rectangle 46a forms a resonant antenna, and the resonant frequency of the second rectangle 46b is sufficiently far removed so as to not be substantially excited and, therefore, acts as a wide transmission line. The feed taken off of the second rectangle 46b is, therefore, substantially an electrical ground. Thus, at 867 MHz the feed structure 48 behaves close to that of a balanced feed where one feed is taken from the center of the antenna (ground). Similarly, at 915 MHz the second rectangle 46b is at resonance and the first rectangle 46a acts as a wide transmission line from ground. Again, the feed structure 48 acts as a balanced feed where one feed is taken from the center of the antenna (ground).

Figure 11B:
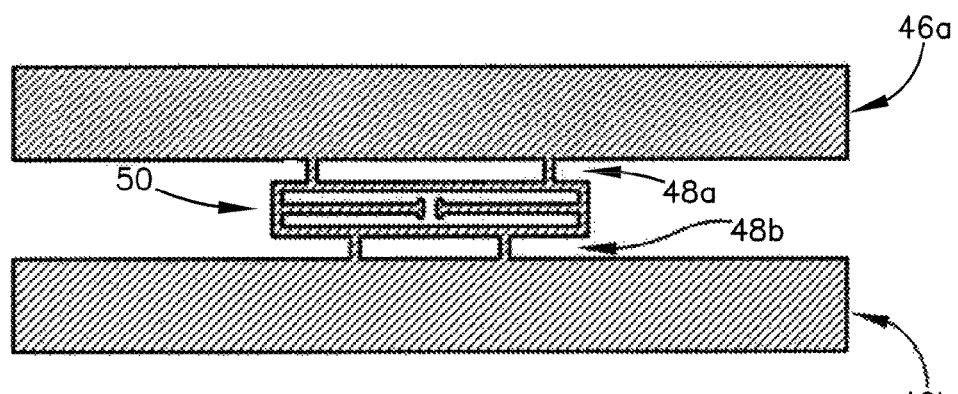
FIG. 11B is a plan view of a two-element microstrip antenna which resonates at two different frequencies, a balanced feed structure, and a shorting-stub matching circuit.

Referring to FIG. 11B, a multi-element 46a,46b patch antenna is shown with balanced feeds 48a,48b coupled with a common shorting-stub matching circuit 50 allowing for antennas resonating at multiple frequencies. This design has dual-resonant behavior, having one resonant frequency at approximately 865 MHz and the second at approximately 915 MHz. The behavior at 915 MHz is an even mode in which the currents in the two antenna elements 46a,46b are moving out of phase, and thus, the radiation pattern of the antenna is not orthogonal to the plane, but rather has two lobes at approximately 45 degree angles.

Microstrip Patch Antenna with Dual Feed Structures

As discussed, four-terminal ICs can be connected to dual dipole antennas, with one pair of terminals being coupled to a first dipole, and the other pair of terminals being coupled to a second dipole that is orthogonal to the first dipole. Because the radiation pattern is nearly spherical, the tag can be read nearly equally well from any orientation. Furthermore, the dual-dipole design is linearly polarized in two orientations, giving it polarization diversity, which is useful for interacting with interrogators using linearly polarized antennas. However, a microstrip antenna has little or no radiation in the direction of the ground plane, and so a dual dipole is generally not useful for achieving directional diversity.

Rather than use the two-port device for special diversity, the two ports can be used for frequency diversity. This can be accomplished by a dual feed structure design using a four-terminal IC connected to rectangular patch antennas by matching circuits resonating at different frequencies so as to provide directional and polarization diversity. In one embodiment of this design, the tag comprises first and second patch antennas, an IC having first and second pairs of terminals, a first matching circuit for coupling the first patch antenna to the first pair of terminals on the IC, wherein the first patch antenna resonates at a first frequency, and a second matching circuit for coupling the second patch antenna to the second pair of terminals on the IC, wherein the second patch antenna resonates at a second frequency. In one embodiment, the first antenna is a microstrip antenna operable above a ground plane separated by a substrate, and the second patch antenna is a dipole antenna operable with the substrate in free space. In one embodiment, the first frequency is identical to the second frequency.

Figure 12:
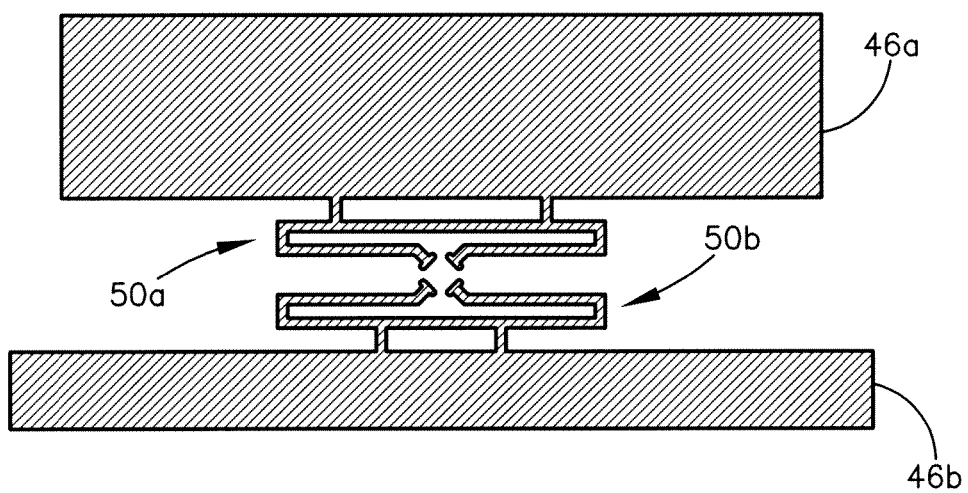
FIG. 12 is a plan view of a first microstrip antenna and a second microstrip antenna for coupling with a four-terminal integrated circuit.

More specifically, because thin microstrip antennas tend to have narrow bandwidths, a multiple-antenna configuration can be used. Referring to FIG. 12, in one embodiment, the four-terminal IC includes one pair of terminals coupled to a first antenna 46a with a matching circuit 50a that resonates at one frequency (e.g., 915 MHz), and another pair of terminals coupled with a second antenna 46b with a matching circuit 50b that resonates at a second frequency (e.g., 866 MHz). Both of the antennas can be coupled to the IC using balanced feeds and a shorting-stub matching circuit.

The use of a substrate affects the resonant behavior of a microstrip antenna differently than it affects the resonant behavior of a dipole or other antenna without a ground plane. It is therefore useful to have an RFID tag that operates with a substrate both over a ground plane and without a ground plane.

Figure 13:
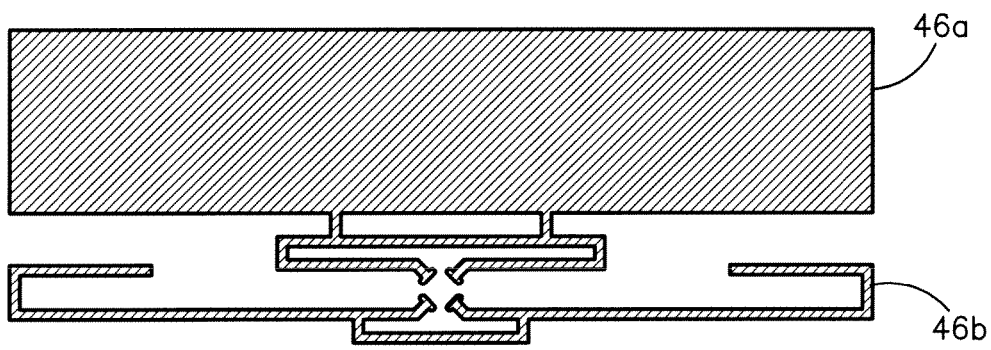
FIG. 13 is a plan view of a microstrip antenna and a dipole antenna for coupling with a four-terminal IC.

Referring to FIG. 13, in one embodiment, two distinct antennas are coupled to the IC. The first antenna is a microstrip antenna designed to work above a ground plane separated by a substrate, and the second antenna is a dipole antenna designed to operate with the same substrate in free space. The two antennas can be tuned to the same or different resonant frequencies.

Microstrip Antenna for Near-Field and Far-Field Operation

The terms "near-field" and "far-field" are generally defined as follows: Let D be the largest dimension of an antenna, and $\lambda$ be the free space wavelength of the frequency of interest (33 cm for 915 MHz). The region of space closer than $2D^2/\lambda$ is generally considered the near-field region, and the region of space further than $2D^2/\lambda$ is generally considered the far-field region.

In the near-field region, magnetic or inductive fields tend to dominate. The inductive field strength falls off with $1/d^3$ of the antenna, where d is distance. Near-field communication within RFID systems generally takes place using inductive coupling, utilizing the strong magnetic fields that are located close to the antenna. Inductive coupling is increased by using loops. Thus, for near-field communication, the interrogator and tag generally use some form of a loop antenna.

In the far-field region, electromagnetic fields tend to dominate, which are the propagating fields. Far-field communication within RFID systems generally takes place using electromagnetic coupling, much like a RADAR system. Commonly, the RFID interrogator antenna is a microstrip antenna, and the RFID tag antenna is some dipole antenna, where both antennas are efficient at radiating energy into the far field.

Combined near-field/far-field dipole-based RFID tags do not adapt well to working with a ground plane in the same way that far-field dipole-based RFID tags do not adapt well to working well near a ground plane. Because patch antennas are typically solid (e.g., a rectangle) and often wide, they are generally not a good source for inductive coupling.

This problem is avoided by a combined near-field/far-field design using a microstrip antenna providing electromagnetic coupling for far-field operation, and a looping matching circuit providing inductive coupling for near-field operation. In one embodiment of this design, the tag comprises a microstrip antenna providing electromagnetic coupling for far-field operation, an IC, and a matching circuit coupling the microstrip antenna with the integrated circuit, wherein the matching circuit has the shape of a loop that is sufficiently large to provide inductive coupling for near-field operation.

Figure 14:
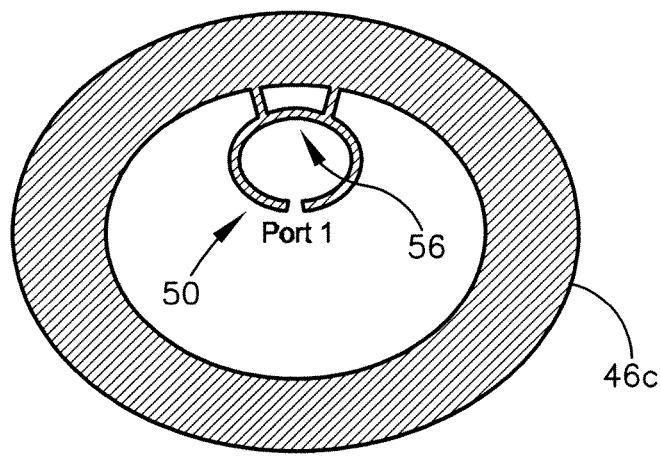
FIG. 14 is a plan view of an annular antenna with a matching circuit coupled with an inner edge of the antenna.
Figure 15:
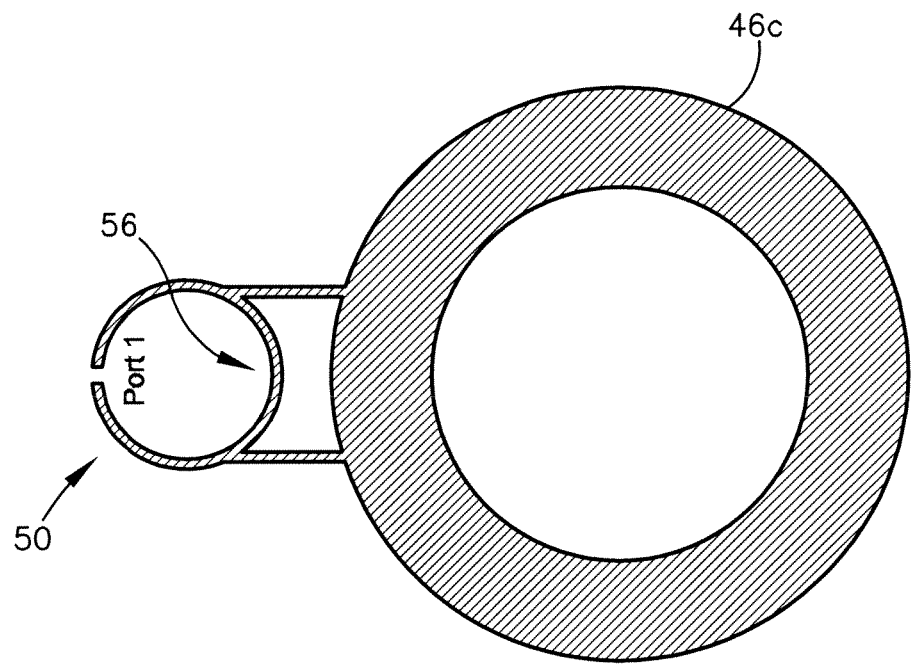
FIG. 15 is a plan view of an annular antenna with a matching circuit coupled with an outer edge of the antenna.
Figure 16:
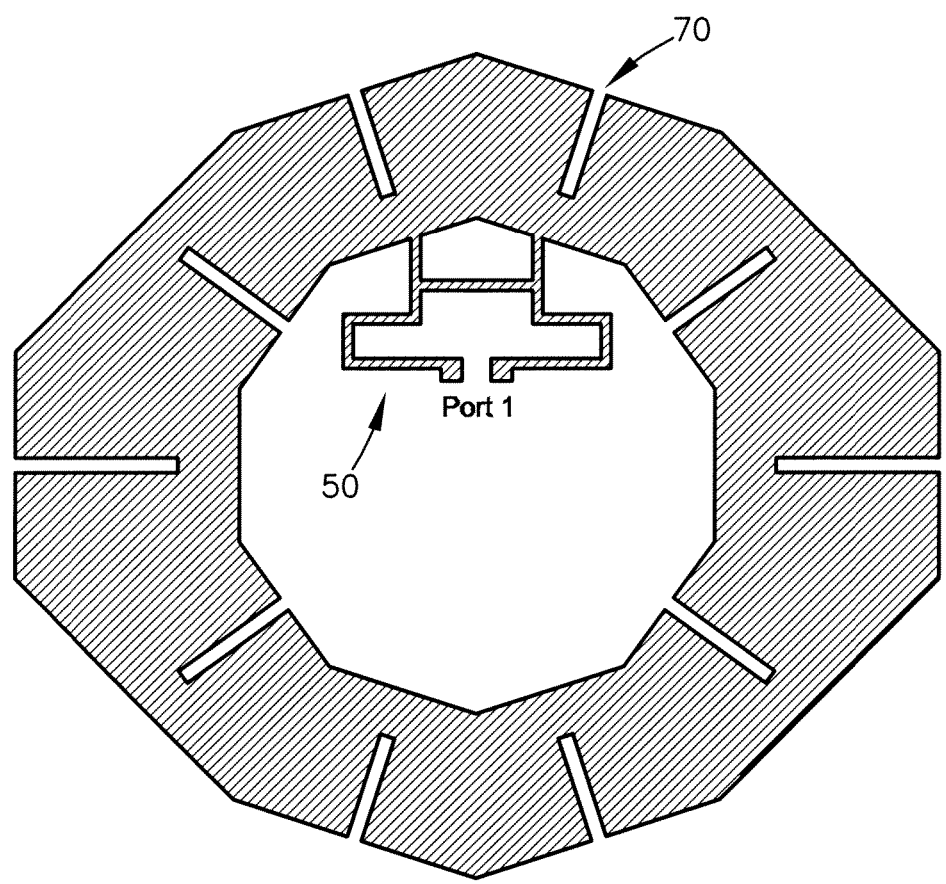
FIG. 16 is a plan view of an annular polygonal antenna having slots.

Examples of combined near-field/far-field tags are shown in FIGS. 14-16, which are described in greater detail below. The matching circuit of FIG. 9 creates a loop of a small area. By modifying the loop to have a much larger area, as shown in FIG. 14, for example, both good near-field and far-field performance can be achieved. More specifically, the loop provides sufficient inductive coupling for near-field operation, while the primary microstrip antenna provides sufficient electromagnetic coupling for far-field operation.

Microstrip Antenna Array for Cylindrical or Conical Objects

It is sometimes necessary to affix the tag to a metal cylinder or cone. Unfortunately, a conventional tag used for this purpose may not be readable if it is located on the other side of the cylinder or cone from the interrogator.

Figure 17:
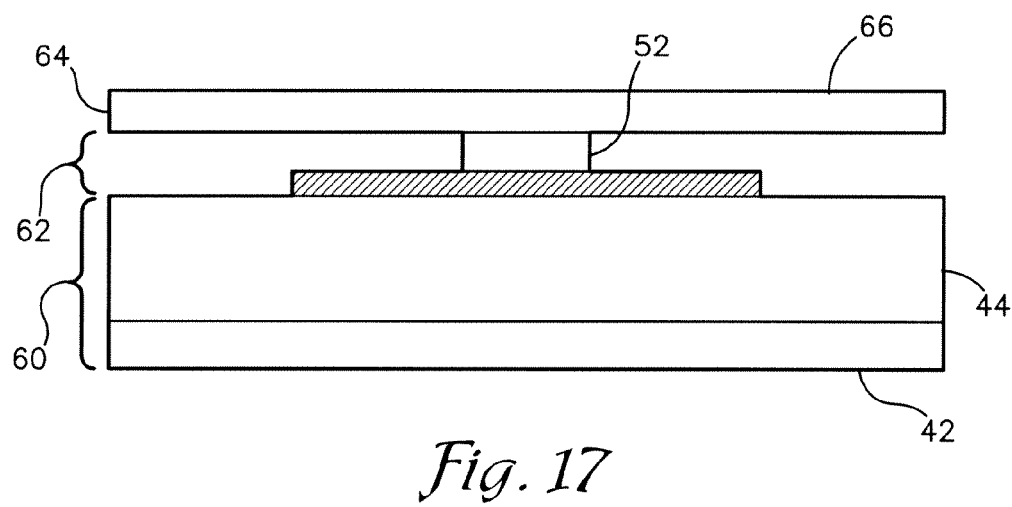
FIG. 17 is a sectional elevation view of a three-layered RFID tag including a superstrate layer.

This problem is avoided by a dual antenna design using first and second microstrip antennas providing directional diversity when affixed to a cylindrical or conical object, and a protective superstrate. In one embodiment of this design, referring to FIG. 17, the tag comprises a first layer 60 including the substrate and the ground plane, a second layer 62 including first and second microstrip antennas, with each antenna extending toward a different side of the object, an IC, and first and second matching circuits coupling the first and second microstrip antennas, respectively, to the IC, and a third layer 64 including a superstrate 66 for protecting the second layer from an adverse condition of an operating environment, such as physical impacts or high temperatures. This design achieves sufficient directional diversity such that at least one of the antennas is substantially always readable regardless of the orientation of the cylinder or cone.

The microstrip may be shorted, resistively loaded, or full length (half wavelength), depending on size and performance requirements.

The superstrate protects the tag from adverse conditions associated with the operating environment, such as physical impacts and high temperatures. The superstrate may have a higher dielectric constant than the substrate of the base layer.

In one embodiment, the dielectric of the superstrate is less than 10; in another embodiment, the dielectric is equal to or less than approximately 6.

To facilitate affixing the tag to the cylinder or cone, the layers may be given a curved shape approximating the curvature of the cylindrical or conical surface, or may be made flexible so as to readily conform to the cylindrical or conical surface when applied thereto.

Microstrip Antenna with Annular Shape

As mentioned, geometries other than rectangles may be used for the antenna design, depending on the requirements of the particular application. It is sometimes necessary to tag the top of a cylinder having a stem. Rectangular antennas are generally not sufficiently conformable for this application.

This problem is avoided by an annular design which is particularly suited for application to the top of a metal cylinder around a stem. In one embodiment of the design, the tag comprises a microstrip antenna having an annular shape with an inner edge and an outer edge, an IC, and a matching circuit coupling the microstrip antenna with the IC. The matching circuit may be coupled with either the inner or outer edge of the annulus. The annular shape may be circular or polygonal.

More specifically, referring to FIG. 14, the matching circuit 50 can be coupled to the inner edge of the annular antenna 46c. In an exemplary embodiment, the outside diameter of the annulus is approximately 86 mm on an approximately 6.2× $10^{-2}$ inch substrate with $\in_r=2.41$ and tan δ $3.5\times10^{-3}$. Referring to FIG. 15, the matching circuit can be coupled to the outer edge of the annular antenna in applications where the antenna is to be placed around stem projecting from the cylinder, such as is the case with water bottles and fire extinguishers.

In some applications, an adjustable annular antenna may be needed. Referring to FIG. 16, one embodiment of the antenna includes slots 70 for redirecting currents. Smaller antennas tend to resonate at higher frequencies, and the slots force the currents to meander, allowing a smaller antenna to resonate at a lower frequency than would otherwise be possible. Furthermore, a multi-sided hollow polygon can be used to approximate a circle to aid in more exact computer simulation of antenna designs. In one embodiment, the hexagonal annulus antenna of FIG. 16 is approximately 66 mm by 60 mm with several slots and a shorting-stub matching circuit coupled to the inside edge of the antenna.

It will be appreciated that features of any two or more of the above-described designs may be combined for maximum benefit. For example, a microstrip antenna with the annular shape may be provided with the balanced feed structure, the dual feed structure, or the structure for combined near-field/far-field operation. Other combinations are possible.

All of the apparatuses and methods disclosed and claimed herein can be made and executed without undue experimentation in light of the present disclosure. While the present invention has been described in terms of particular embodiments, it will be apparent to those of ordinary skill in the art that variations may be applied to the methods and in the steps or in the sequence of steps of the method described herein without departing from the concept, spirit, and scope of the invention. All such similar substitutes and modifications apparent to those skilled in the art are deemed to be within the spirit, scope, and concept of the disclosure as defined by the appended claims.

The invention claimed is:

1. A radio frequency identification transponder comprising:
   a microstrip patch antenna;
   a first feed and a second feed, each feed being coupled with an edge of the microstrip patch antenna; and
   a matching circuit coupling the first and second feeds with an integrated circuit.

2. The radio frequency identification transponder of claim 1 wherein the first feed is approximately 180 degrees out of phase with the second feed.

3. The radio frequency identification transponder as set forth in claim 1, wherein the first feed and the second feed are each located an approximately equal distance from and on opposite sides of an approximate center of a non-radiating edge.

4. The radio frequency identification transponder as set forth in claim 1, wherein the first feed and the second feeds each consist of one or more microstrip transmission lines.

5. The radio frequency identification transponder as set forth in claim 1, wherein the matching circuit includes a first transmission line coupled with the first feed and a second transmission line coupled with the second feed, and the first and second transmission lines are substantially symmetrical with respect to an approximate center between the first and second feeds.

6. The radio frequency identification transponder as set forth in claim 5, wherein the first transmission line and the second transmission line are coupled with the integrated circuit.

7. The radio frequency identification transponder as set forth in claim 1, wherein the matching circuit consists of a first transmission line coupled with the first feed and a second transmission line coupled with the second feed, and the first and second transmission lines are substantially symmetrical with respect to an approximate center between the first and second feeds.

8. The radio frequency identification transponder as set forth in claim 1, wherein the matching circuit includes a transmission line coupling the first feed with the second feed and creating a virtual short between the feeds.

9. In a radio frequency identification transponder for physical association with an object and for storing and communicating data regarding the object, the radio frequency identification transponder having a microstrip patch antenna and an integrated circuit, the transponder further comprising:
   a first feed and a second feed, each feed being coupled with an edge of the microstrip patch antenna; and
   a matching circuit coupling the first and second feeds with the integrated circuit.

10. The radio frequency identification transponder as set forth in claim 9, wherein the first feed is approximately 180 degrees out of phase with the second feed.

11. The radio frequency identification transponder as set forth in claim 10, wherein the matching circuit includes a transmission line coupling the first feed with the second feed and creating a virtual short between the feeds.

12. The radio frequency identification transponder as set forth in claim 11, wherein the first feed and the second feed are each located an approximately equal distance from and on opposite sides of an approximate center of a non-radiating edge.

13. The radio frequency identification transponder as set forth in claim 11, wherein the first fee and the second feed each consists of one or more microstrip transmission lines.

14. The radio frequency identification transponder as set forth in claim 11, wherein the matching circuit consists of a first transmission line coupled with the first feed and a second transmission line coupled with the second feed, and the first and second transmission lines are substantially symmetrical with respect to an approximate center between the first and second feeds.

15. A radio frequency identification transponder comprising:
- a first patch antenna and a second patch antenna;
- an integrated circuit having a first pair of terminals and a second pair of terminals; and
- a first matching circuit for coupling the first patch antenna to the first pair of terminals; and
- a second matching circuit for coupling the second patch antenna to the second pair of terminals.

16. The radio frequency identification transponder as set forth in claim 15, wherein the first matching circuit resonates at a first frequency, and the second matching circuit resonates at a second frequency.

17. The radio frequency identification transponder as set forth in claim 15, further including, for each patch antenna, first and second balanced feeds and a shorting stub coupling the balanced feeds.

18. The radio frequency identification transponder as set forth in claim 15, wherein the first patch antenna is a microstrip patch antenna operable above a ground plane separated by a substrate.

19. The radio frequency identification transponder as set forth in claim 18, wherein the second patch antenna is operable with the substrate in free space.

20. The radio frequency identification transponder as set forth in claim 16, wherein the first frequency is approximately identical to the second frequency.

21. In a radio frequency identification transponder for physical association with an object and for storing and communicating data regarding the object, the transponder further comprising:
- a first patch antenna and a second patch antenna; and
- an integrated circuit having a first pair of terminals and a second pair of terminals;
- wherein the first pair of terminals is coupled to the first patch antenna, and the second pair of terminals is coupled to the second patch antenna.

22. The radio frequency identification transponder as set forth in claim 21 further comprising:
- a first matching circuit for coupling the first patch antenna to the first pair of terminals; and
- a second matching circuit for coupling the second patch antenna to the second pair of terminals.

23. The radio frequency identification transponder as set forth in claim 22, wherein the first matching circuit resonates at a first frequency, and a second matching circuit resonates at a second frequency.

24. The radio frequency identification transponder as set forth in claim 21 further including, for each patch antenna, first and second balanced feeds.

25. The radio frequency identification transponder as set forth in claim 24 further including a shorting stub coupling the balanced feeds.

26. The radio frequency identification transponder as set forth in claim 21, wherein the first patch antenna is a microstrip path antenna operable above a ground plane separated by a substrate.

27. The radio frequency identification transponder as set forth in claim 26, wherein the second patch antenna is operable with the substrate in free space.

28. The radio frequency identification transponder as set forth in claim 23, wherein the first frequency is approximately identical to the second frequency.

29. A radio frequency identification transponder comprising:
- a microstrip patch antenna having an annular shape with an inner edge and an outer edge;
- an integrated circuit;
- a first feed and a second feed, each feed being coupled with either edge of the microstrip patch antenna; and
- a matching circuit coupling the first and second feeds with the integrated circuit.

30. The radio frequency identification transponder of claim 29, wherein the first feed is approximately 180 degrees out of phase with the second feed.

31. The radio frequency identification transponder of claim 29, wherein the matching circuit further includes a transmission line coupling the first feed with the second feed and creates a virtual short between the feeds.

32. The radio frequency identification transponder as set forth in claim 29, wherein the matching circuit is coupled with the inner edge of the microstrip patch antenna.

33. The radio frequency identification transponder as set forth in claim 29, wherein the matching circuit is coupled with the outer edge of the microstrip patch antenna.

34. The radio frequency identification transponder as set forth in claim 29, wherein the microstrip antenna has an annular polygonal shape.

35. The radio frequency identification transponder as set forth in claim 34, further including one or more slots manufactured into the annular polygonal shape.

36. In a radio frequency identification transponder for physical association with a cylindrical object having a stem and for storing and communicating data regarding the object, the radio frequency identification transponder having a microstrip patch antenna and an integrated circuit, the transponder further comprising:
- the microstrip patch antenna having an annular shape with an inner edge and an outer edge;
- a first feed and a second feed, each feed being coupled to the microstrip patch antenna, and the first feed being approximately 180 degrees out of phase with the second feed; and
- a matching circuit coupling the first and second feeds with the integrated circuit.

37. The radio frequency identification transponder as set forth in claim 36, wherein each feed is coupled with either edge of the microstrip patch antenna.

38. The radio frequency identification transponder as set forth in claim 36, wherein the matching circuit includes a transmission line coupling the first feed with the second feed and creates a virtual short between the feeds.

39. The radio frequency identification transponder as set forth in claim 36, wherein the matching circuit is coupled with the inner edge of the microstrip patch antenna.

40. The radio frequency identification transponder as set forth in claim 36, wherein the matching circuit is coupled with the outer edge of the microstrip patch antenna.

41. The radio frequency identification transponder as set forth in claim 36, wherein the microstrip patch antenna has an annular polygonal shape.

42. The radio frequency identification transponder as set forth in claim 41, further including one or more slots manufactured into the annular shape.

* * * * *